(12) United States Patent
Yang

(10) Patent No.: US 7,708,123 B2
(45) Date of Patent: May 4, 2010

(54) SPRING DEVICE WITH CAPABILITY OF INTERMITTENT RANDOM ENERGY ACCUMULATOR AND KINETICS RELEASE TRIGGER

(76) Inventor: Tai-Her Yang, 6F-5 No. 250, Sec. 4, Chung Hsiao E. Rd., Taipei (TW)

( * ) Notice: Subject to any disclaimer, the term of this patent is extended or adjusted under 35 U.S.C. 154(b) by 578 days.

(21) Appl. No.: 11/500,976

(22) Filed: Aug. 9, 2006

(65) Prior Publication Data

US 2008/0036127 A1    Feb. 14, 2008

(51) Int. Cl.
*F16D 47/04*    (2006.01)

(52) U.S. Cl. .............. 188/171; 188/166; 192/41 S; 192/48.3

(58) Field of Classification Search .......... 192/87.11, 192/41 S, 70.17–70.27, 99 S; 475/129; 188/166, 188/167, 171
See application file for complete search history.

(56) References Cited

U.S. PATENT DOCUMENTS

| | | | |
|---|---|---|---|
| 4,502,578 A * | 3/1985 | Koyama | 192/26 |
| 4,570,768 A * | 2/1986 | Nishimura et al. | 192/35 |
| 5,090,538 A * | 2/1992 | Osawa | 192/84.81 |
| 5,135,086 A * | 8/1992 | Ciolli | 192/48.3 |
| 5,573,472 A * | 11/1996 | Ciolli | 475/301 |
| 6,059,086 A * | 5/2000 | Studer | 192/56.2 |
| 6,409,002 B1 * | 6/2002 | Orlamunder et al. | 192/70.17 |
| 6,755,284 B2 * | 6/2004 | Revelis et al. | 188/2 D |
| 6,808,054 B2 * | 10/2004 | Hirt et al. | 192/87.11 |
| 6,817,453 B2 * | 11/2004 | Koeppe, Jr. | 188/171 |
| 2007/0004548 A1 * | 1/2007 | Bai | 475/129 |
| 2007/0131512 A1 * | 6/2007 | Ronk et al. | 192/85 C |
| 2007/0137978 A1 * | 6/2007 | Yamada et al. | 192/223.2 |

* cited by examiner

*Primary Examiner*—Christopher P Schwartz
(74) *Attorney, Agent, or Firm*—Bacon & Thomas, PLLC

(57) ABSTRACT

A spring device includes an intermittent accumulator and kinetics release trigger that gradually winds up to accumulate kinetic energy (kinetics) as driven by manual or other random intermittent kinetics, and drives a kinetics release control to trigger the spring to release kinetics to drive a load once the kinetics supplied to the spring is accumulated to a preset value.

11 Claims, 2 Drawing Sheets

*a*: spring energy accumulator value

*b*: Deceleration ratio of input mechanism input rpm vs. spring input end drive rpm

1

SPRING DEVICE WITH CAPABILITY OF INTERMITTENT RANDOM ENERGY ACCUMULATOR AND KINETICS RELEASE TRIGGER

BACKGROUND OF THE INVENTION (a) Field of the Invention

The present invention is related to a spring device for accumulating random kinetic energy (hereinafter, "kinetics") in the spring to release higher power output or to drive a load at higher rpm, and more particularly to a device that gradually restores non-continuous kinetics, kinetics at lower rpm, or instable kinetics through a transmission to accumulate kinetics by winding the spring, and to drive a release controller when the accumulator rises to a preset value to trigger the spring to release kinetics for driving a load until the release of the kinetics reaches a periodically balanced status with respect to the load side.

(b) Description of the Prior Art

Conventional driving approaches involve manual cranking, pulling or winding such as a hand cranking or pedal generator; or a device driven by wind such as a micro wind generator or pump; or a device generating power by kinetics; or a device generating power by vibration; or a device driven by a balance wheel or a motive block such as one produced by SEIKO in which the random kinetics from the balance wheel charges an electric storage device through a generator driven by an acceleration gear, with the electric energy supplied from the electric storage device to drive the dynamo-electric power system of the movement of a quartz wristwatch. However, such configurations were found to be defective because intermittent discontinuous kinetics from the balance wheel or weak kinetics from the balance wheel will slow the rpm of the generator even when driven through an acceleration gear, and therefore fail to fully charge an unsaturated rechargeable electric storage device due to lower voltage output of the generator, and also waste the kinetics from the balance wheel.

SUMMARY OF THE INVENTION

The primary purpose of the present invention is to provide a spring device that is adapted as an intermittent energy accumulator and an energy release trigger. The spring gradually winds up by manual or other random intermittent kinetics for energy accumulation to a preset value, to drive the energy release control device and cause the spring to release the energy to further drive a load.

DETAILED DESCRIPTION OF THE PREFERRED EMBODIMENTS

Conventional manual drive, or random discontinuous drive, or drive at low rpm, or drive with unstable random kinetics is usually insufficient to drive a load effectively. Taking a manually driven generator for example, it generates a pulse output voltage due to instable speed or an output voltage that is insufficient at lower rpm since it is difficult for the manual drive to drive at uniform speed. Similar defect is found with a pedal generator. When driven by an unbalanced wheel or motive block, the rpm also appears lower or instable; and similar defect occurs when the load is driven by wind or tidal energy. If driven by any of these forms of kinetics, the generated voltage from the generator often gets too low for meaningful use due to lower rpm, resulting in the waste of energy. For example, if the generator operates for charging purpose and its output voltage is lower than that of a rechargeable energy storage device (ESD), or operates for driving an energy driven light emitting device (LED) and the output voltage is insufficient to illuminate the LED, i.e., to reach the level of working voltage of the LED; or operates for driving a mechanical displacement device and the force created by energy fails to overcome the static friction in the mechanism; the energy is wasted and the weaker kinetics input becomes ineffective.

Figure 1:
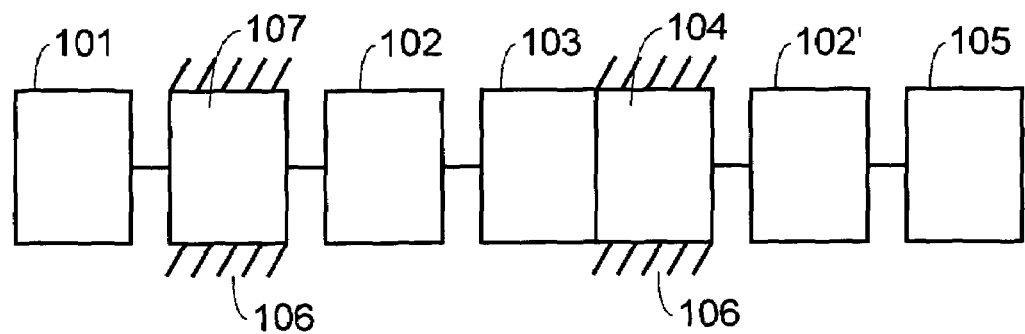
FIG. 1 is the first schematic diagram showing a configuration of the present invention.
Figure 2:
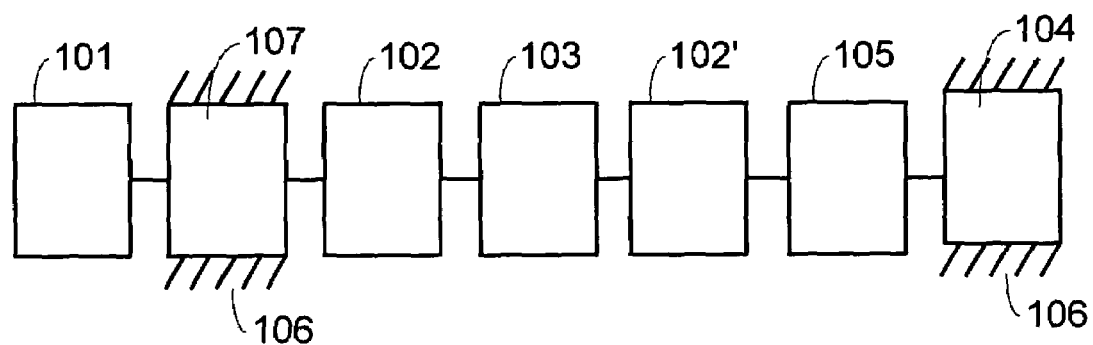
FIG. 2 is the second schematic diagram showing another configuration of the present invention.
Figure 3:
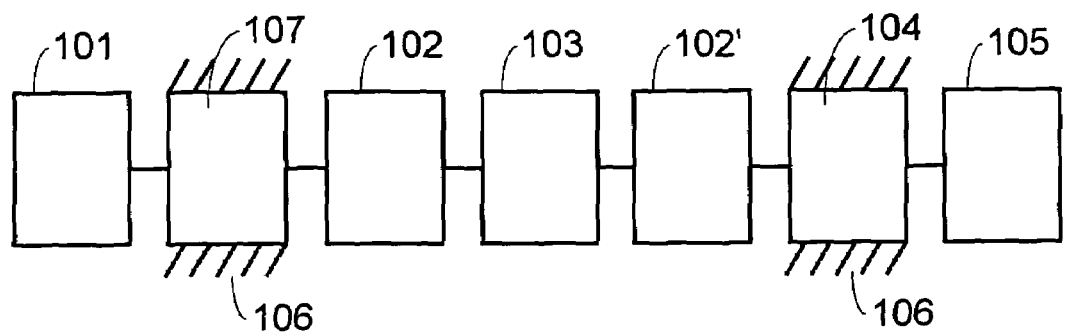
FIG. 3 is the third schematic diagram showing another configuration of the present invention.
Figure 4:
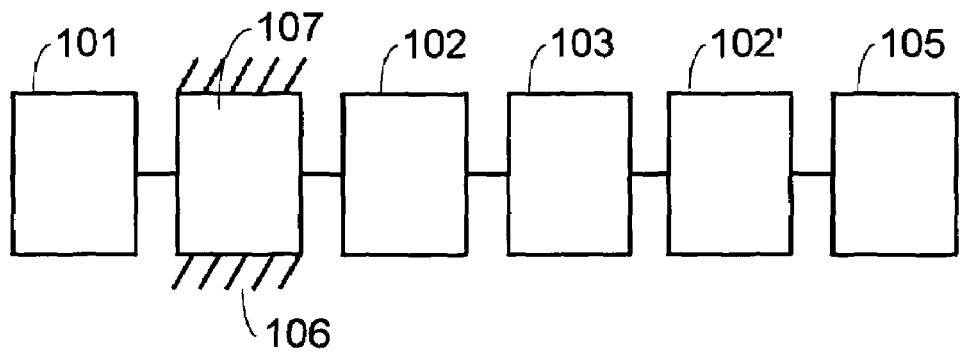
FIG. 4 is the forth schematic diagram showing another configuration of the present invention.

The spring device adapted as intermittent energy accumulator and energy release trigger of the present invention relates to one that is driven by a transmission to accumulate kinetics from those discontinuous, slower rpm or instable kinetics, and is triggered to release the accumulated kinetics through a release control device once the accumulation of the spring device mounts up to a preset output value to release greater power output or higher rpm in driving a load. FIG. 1 is a schematic diagram showing a configuration of the present invention. The present invention is essentially comprised of:

an input mechanism 101: including a rolling shaft, a roller wheel, or a handle or any other that permits rotational drive, reciprocal pull, swing, or vibration subject to be driven by manual, mechanical, electromagnetic, or electric motor force or kinetics, or subject to one way or two-way drive by natural force to produce one-way displacement drive kinetics;

an energy accumulation transmission device 102: is related to an optional item installed by requirement or not, which includes various types of devices of acceleration, deceleration, uniform speed, changing motion for circulation or linear transmission, e.g., a transmission gear set or gear system or linkages, for transmission of mechanical kinetics from the input mechanism 101 to drive a spring 103 to be described below;

the spring 103: a spring device to accumulate mechanic energy from the input mechanism 101 includes vortex, spiral, sheet, or any other form of spring device that allows accumulation of mechanical energy;

an energy release control clutch device 104: comprised of a mechanical clutch with its torque limit actuation function that may be fixed, preset or adjustable, or of a friction clutch provided with a static friction value greater than a dynamic friction, or of a clutch with limited torque value controlled by electro-magnetic or fluid force; and that may be provided in any of the following methods as applicable:

(1) One of both interaction ends of the clutch 104 is linked to the output end of the spring 103 and coupled to the input end of a load 105 and the other is connected to a static part 106, such that when the elasticity to which the spring 103 is subject reaches its critical value, the clutch 104 is released to output the accumulated energy to drive a load 105 and the energy release control clutch device 104 is closed again when the spring 103 stops outputting, as illustrated in FIG. 1, which is a schematic diagram showing a configuration of the present invention; or (2) Both interaction ends of the energy release control clutch 104 device are connected between the motive part of the load 105 and the static part 106 of the casing; such that when the elastic force to which the spring 103 is subject reaches its critical value, the energy release control clutch device 104 is released to output the accumulated energy from the spring 103 to drive the load 105 and the energy release control clutch device 104 is closed again while the spring 103 stops outputting, as illustrated in FIG. 2, which is a schematic diagram showing another configuration of the present invention; or, (3) One end of both interaction ends of the energy release control clutch device 104 is coupled to the spring 103 and with a coupling structure of the motive part of the load 105; and the other end is attached to the static part 106 of the casing; such that when the elastic force to which the spring 103 is subject reaches its critical value, the energy release control clutch device 104 is released to output the accumulated energy from the spring 103 to drive the load 105 and the energy release control clutch device 104 is closed again when the spring 103 stops outputting, as illustrated in FIG. 3, which is a schematic diagram showing another configuration of the present invention; or, (4) The load 105 given with different value between static friction and dynamic friction functions as a damper; the input end of the spring 103 is coupled to the output end of the accumulation transmission 102 to accumulate energy from the input mechanism 101; the output end of the spring 103 drives the load 105; and the load 105 has a greater static friction than the dynamic friction to provide similar function of energy release control so that the energy release control clutch device 104 need not be used; such that when the accumulated torque at the spring 103 reaches the critical value of the static friction, the load 105 turns from static friction status to dynamic friction status for driving; the spring 103 release kinetics to drive the load 105 until the kinetics of the spring 103 is balanced with the dynamic friction value of the load to return the load to static friction status, as illustrated in FIG. 4, which is a schematic diagram showing another configuration of the present invention.

the load 105: related to any rotational or linear load driven by the spring 103, and more particularly, to one for directly driving a pump or driving a pump through an acceleration or deceleration output transmission 102' so to further pump a working liquid, or for driving other mechanical loads; or for directly driving a generator, or for driving a generator through the acceleration or deceleration output transmission 102'; whereby the electric energy from the generator in turn directly outputs to drive a load, or charges a rechargeable device; and the electric energy from the rechargeable device is supplied to a wristwatch or a pocket watch to drive a quartz movement or any other movement driven by electric energy, or the electric energy is supplied to a load including a portable communication, video, information AV recorder/player, camera, camera/video recorder, or light emitting device;

the output transmission 102': related to a rotational or linear transmission of acceleration, deceleration, equal speed, or variable motion forms, e.g., various types of transmission gear sets, or chain system or linkage for transmitting the mechanical drive kinetics inputted to the spring 103 to further drive the load 105; the output transmission 102 being an optional item that may be or may not be provided depending on requirement;

a one-way transmission 107: related to ratchet gear and ratchet wheel structure to engage in one-way drive, or any other one-way transmission; disposed between the input end of the spring 103 and the static part 106 of the casing; the input end of the spring 103 relating to any rotational mechanical part disposed between the input mechanism 101 through the accumulation transmission 102 and the input end of the spring 103.

In the spring system adapted as intermittent energy accumulator and energy release trigger of the present invention, if the accumulation transmission 102 is provided with an irreversible transmission or a transmission 108 of an irreversible transmission is provided, the one-way transmission 107 otherwise disposed between the input end of the spring 103 and the static part 106 of the casing may be omitted.

To increase the accumulation efficiency, the accumulation transmission 102 may be a variable speed transmission that depends on the value of the torque so that when the accumulation level of the spring 103 is lower, the accumulation transmission 102 winds up the spring 103 with smaller torque and faster speed from the input mechanism 101, and later winds up the spring 103 at greater torque and slower speed from the input mechanism 101 when the speed variable ratio changes as the accumulation of the spring 103 increases.

Figure 5:
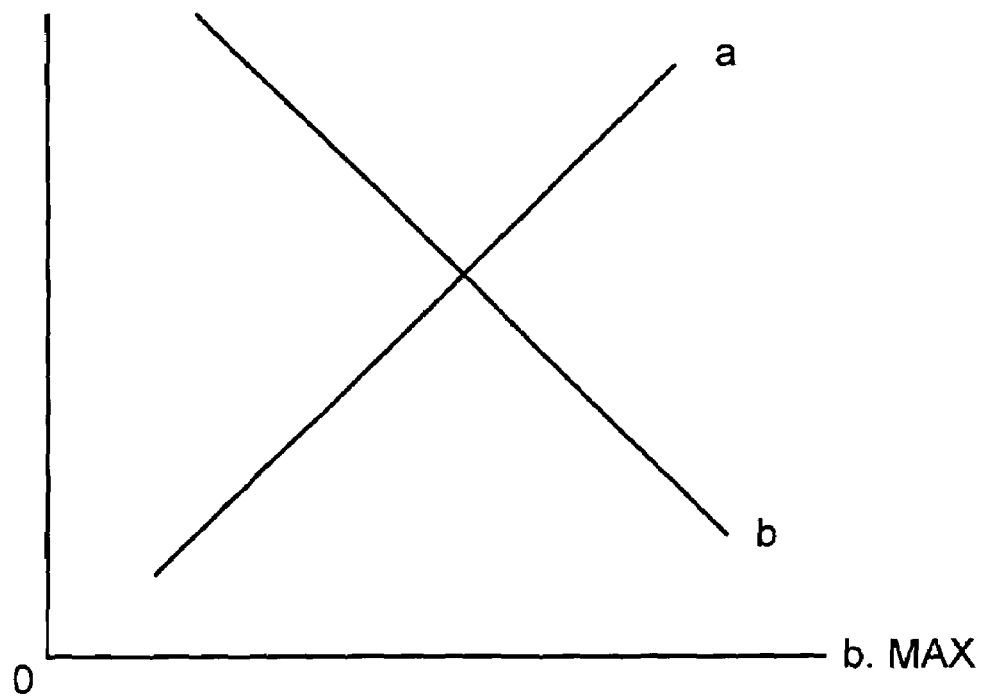
FIG. 5 is a schematic diagram showing operation relation between spring accumulation value and deceleration ratio of the present invention.

FIG. 5 is a schematic diagram showing an operating relationship between accumulation value and deceleration ratio of the present invention. Reference character "a" relates to the accumulation value of the spring 103 and "b" to the deceleration ratio between the input rpm from the input mechanism 101 and the drive rpm at the input end of the spring 103. The transmission with its speed variable depending on the value of the torque may be a continuous variable transmission, or step variable transmission, the operation methods include manual or automatic speed variation ratio of the conventional speed variable device.

The present invention of a spring device adapted as accumulator and energy release trigger by driving a spring device to gradually wind up from manually driven or other intermittent kinetics, and driving an energy release controller to trigger off the spring to release energy for driving a load once the accumulation in the spring reaches a preset value effectively accumulates discontinuous kinetics, kinetics at lower rpm, or instable random kinetics to drive the energy release control when the accumulation reaches the preset value to trigger off the spring to release energy for providing higher power and rpm output and therefore is innovative with precise functions. The present invention is further characterized in that an optional deceleration type of output transmission is disposed to help even minimum kinetics drive the spring to mount up for accumulation purpose; or an optional acceleration type of output transmission is disposed to accelerate the rpm of the generator; or an optional deceleration type of output transmission is provided to generate output with larger torque and slower rpm. Therefore, this patent application is duly filed.

The invention claimed is:

1. A spring device including an intermittent accumulator and kinetic energy release trigger that gradually winds up to accumulate energy when driven by manual or other intermittent kinetic energy, and that drives a kinetic energy release control to trigger a spring to release kinetic energy to drive a load once the kinetic energy of the spring is accumulated to a preset value, comprising:

a spring arranged to accumulate kinetic energy in one direction;

an input mechanism connected to the spring and arranged to supply kinetic energy to the spring;

a load to be driven by said accumulated kinetic energy when the accumulated kinetic energy is released by the spring;

an energy release control clutch device connected to the spring and arranged to prevent said release of accumulated kinetic energy from the spring to the load until a predetermined amount of kinetic energy has been accumulated in the spring, wherein said spring accumulates energy supplied by said input mechanism until said predetermined amount of kinetic energy has been accumulated in said spring, wherein during said accumulation of energy said clutch device prevents said release of accumulated kinetic energy to the load so that none of the input kinetic energy is supplied to the load, and wherein said input kinetic energy is thereafter supplied to the load only after said accumulation of a predetermined amount of kinetic energy to thereby prevent smaller amounts of kinetic energy that would otherwise be wasted from being supplied to the load.

2. A spring device as claimed in claim 1, further comprising an output transmission connected between the spring and the load.

3. A spring device as claimed in claim 1, further comprising a one-way transmission disposed between the input end of the spring and a static part of a casing to provide said kinetic energy from the input mechanism to the spring in one direction.

4. A spring device as claimed in claim 1, wherein one of two interaction ends of the energy release control clutch device is linked to an output end of the spring and coupled to the input end of the load and the other of the two interaction ends is connected to a static part, wherein when an elastic force of the spring reaches a critical value, the energy release control clutch device is released to output the accumulated kinetic energy to drive the load and the energy release control clutch device is closed again when the spring stops outputting the accumulated kinetic energy.

5. A spring device as claimed in claim 1, wherein both interaction ends of the energy release control clutch device are disposed between the load and a static part of a casing, wherein when an elastic force of the spring reaches a critical value, the energy release control clutch device is released to output the accumulated energy to drive the load and the energy release control clutch device is closed again when the spring stops outputting.

6. A spring device as claimed in claim 1, wherein one of two interaction ends of the clutch is coupled to the spring and further to a coupling structure of a motive part of the load and the other of the two interaction ends is attached to a static part of the casing; wherein when an elastic force of the spring reaches a critical value, the energy release control clutch device is released to output the accumulated energy to drive the load and the energy release control clutch device is closed again when the spring stops outputting.

7. A spring device as claimed in claim 1, wherein the energy release control clutch device is provided by static friction of the load, wherein the input end of the spring is coupled to the output end of the accumulation transmission to accumulate energy from the input mechanism; the output end of the spring drives the load; and the load has a greater static friction value than dynamic friction value such that when an accumulated torque at the spring exceeds a critical value of the static friction of the load, the load turns from static friction status to dynamic friction status and thereby permits the spring to release energy to drive the load until the kinetic energy of the spring decreases below the dynamic friction value of the load to return the load to static friction status.

8. A spring device as claimed in claim 1, wherein the input mechanism supplies said kinetic energy to the load through an irreversible transmission.

9. A spring device as claimed in claim 1, further comprising a variable speed accumulation transmission in which a speed depends on a value of torque so that when a level of accumulated kinetic energy in spring is low, the accumulation transmission winds up the spring with smaller torque and faster speed from the input mechanism, and later winds up the spring at greater torque and slower speed from the input mechanism when the speed variable ratio changes as the level of accumulated kinetic energy in the spring increases.

10. A spring device as claimed in claim 1, further comprising a deceleration type of output transmission arranged to enable minute amounts of kinetic energy to drive the spring to accumulate kinetic energy.

11. A spring device as claimed in claim 1, further comprising a deceleration type of output transmission arranged to generate an output with larger torque and slower rpm.

* * * * *